(12) United States Patent
Walker

(10) Patent No.: US 8,206,070 B2
(45) Date of Patent: Jun. 26, 2012

(54) WELD ADAPTER

(75) Inventor: William R. Walker, Henderson, NV (US)

(73) Assignee: Hydro-Craft Inc., Rochester Hills, MI (US)

( * ) Notice: Subject to any disclaimer, the term of this patent is extended or adjusted under 35 U.S.C. 154(b) by 445 days.

(21) Appl. No.: 12/456,482

(22) Filed: Jun. 17, 2009

(65) Prior Publication Data

US 2009/0311070 A1 Dec. 17, 2009

Related U.S. Application Data

(60) Provisional application No. 61/132,276, filed on Jun. 17, 2008.

(51) Int. Cl.
*F16B 39/10* (2006.01)

(52) U.S. Cl. .......................................... 411/119; 411/120

(58) Field of Classification Search .................. 411/107, 411/112, 113, 119, 520, 523, 120, 522, 524
See application file for complete search history.

(56) References Cited

U.S. PATENT DOCUMENTS

| | | | | |
|---|---|---|---|---|
| 2,717,622 | A * | 9/1955 | Flora | 411/112 |
| 4,385,858 | A * | 5/1983 | Bell | 411/112 |
| 4,875,816 | A * | 10/1989 | Peterson | 411/104 |
| 4,878,696 | A | 11/1989 | Walker | |
| 5,016,461 | A | 5/1991 | Walker et al. | |
| 5,205,520 | A | 4/1993 | Walker | |
| 5,209,440 | A | 5/1993 | Walker | |
| 5,280,964 | A | 1/1994 | Walker et al. | |
| 5,338,138 | A * | 8/1994 | Pavur et al. | 411/107 |
| 5,558,362 | A * | 9/1996 | Acker et al. | 280/728.2 |
| 5,558,369 | A * | 9/1996 | Cornea et al. | 280/800 |
| 6,709,182 | B1 * | 3/2004 | De Jong | 403/12 |
| 2006/0179785 | A1 * | 8/2006 | Stewart et al. | 52/699 |

FOREIGN PATENT DOCUMENTS

CA 1293752 12/1991

* cited by examiner

*Primary Examiner* — Gary Estremsky

(74) *Attorney, Agent, or Firm* — Warn Partners, P.C.

(57) ABSTRACT

The present invention is a weld adapter including a body portion having a first aperture and at least two flanges connected to the body portion. The present invention also includes a second aperture formed in one of the at least two flanges, with the second aperture substantially aligned with the first aperture. Additionally, one of the flanges is adaptable for being connected to a structure.

18 Claims, 2 Drawing Sheets

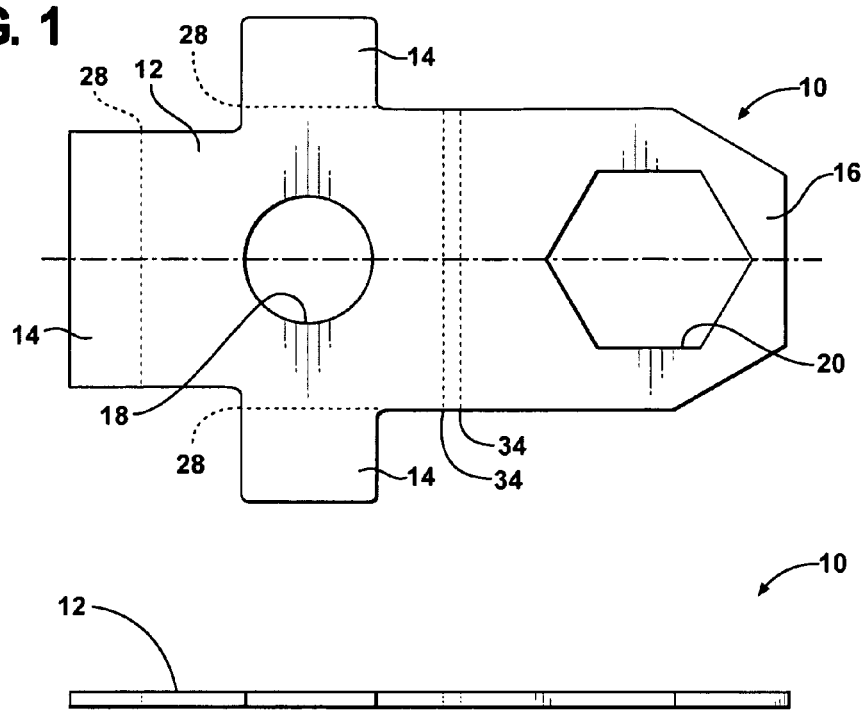
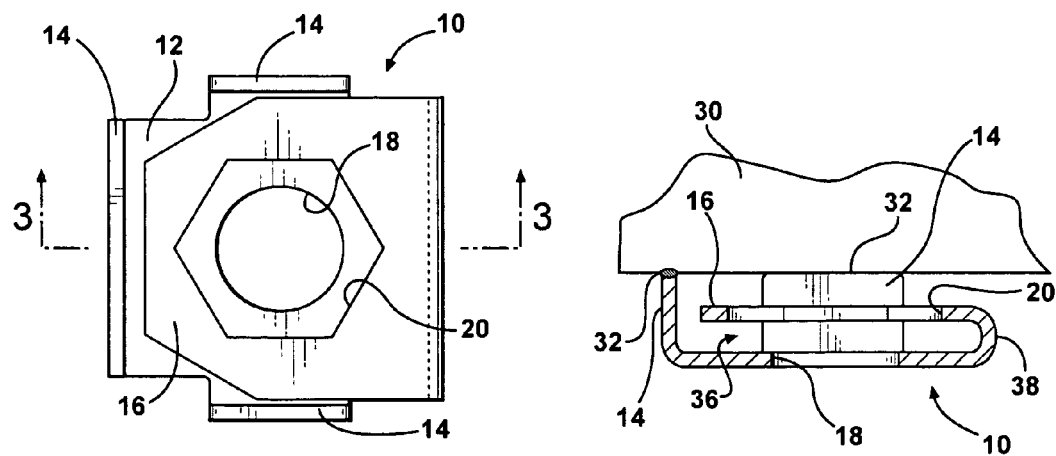

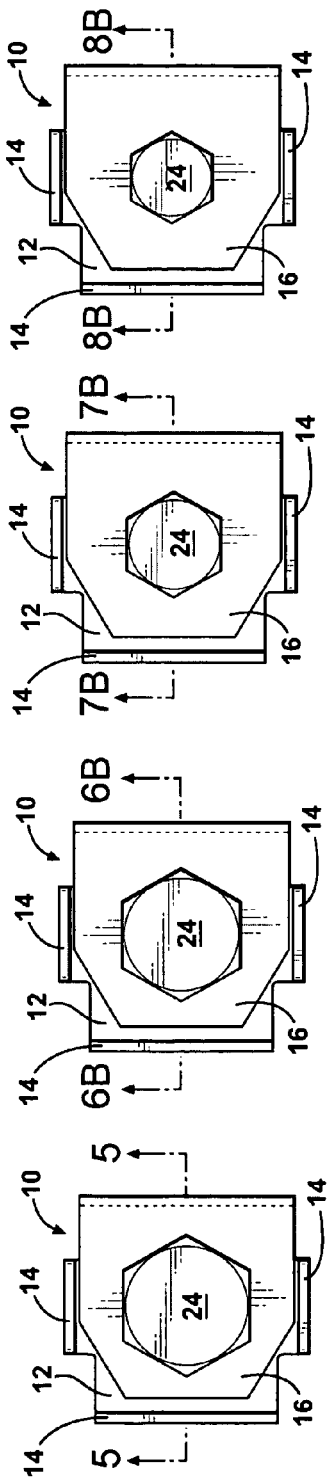
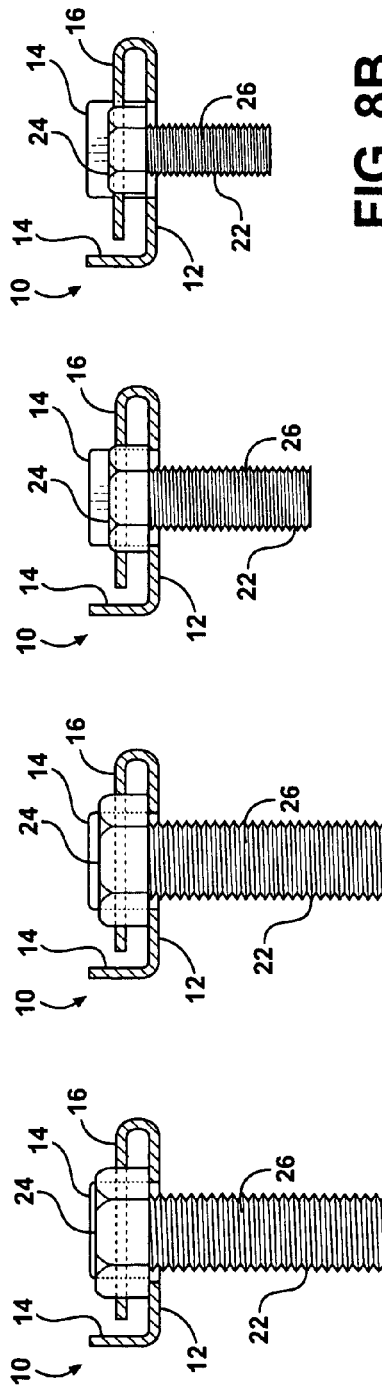

WELD ADAPTER

CROSS-REFERENCE TO RELATED APPLICATIONS

This application claims the benefit of U.S. Provisional Application No. 61/132,276 filed Jun. 17, 2008. The disclosure of the above application is incorporated herein by reference.

FIELD OF THE INVENTION

The present invention relates to a connection device used for providing a mounting support for a structure, such as a tank. More particularly, the present invention is a weld adapter which is welded to the side of a structure, such as a tank or piping, such that the weld adapter can be used along with a fastener, such as a bolt, for securing the structure to a corresponding surface.

BACKGROUND OF THE INVENTION

Fastening devices for retaining pipes, tubing, or hoses which are used for carrying hydraulic oil, air, coolant or other fluids in fixed position are employed in various industrial applications. Most of the time, these pipes, tubing, and hoses are secured in place using a device commonly referred to as a weld adapter. Typical weld adapters are made using a stamping process which incorporates the use of a progressive die. The weld adapter is produced using the progressive die and is welded to the side of the structure, such as a pipe, tubing, or hose. A fastener such as a bolt is commonly used with the weld adapter where the threads of the bolt extend out of the weld adapter which allows the bolt to be fastened to any type of rigid metal member. The member can range from the frame of a machine or vehicle to a structural steel beam in a factory. Once the weld adapter is fastened to the tank or tubing, the tank or tubing can then be mounted in place, or other fixtures can be attached at the adapter.

Weld adapters must be suitable for standing up to heavy structural loads, as well as stand up to heavy welding, and any other kinds of loads that may be placed on the fasteners. The tubing or pipes may carry various fluids of different weights and may also be of different sizes such that high structural loads may be placed on the weld adapters and fasteners. Many types of weld adapters are made using a stamping or forging process which does not always lend itself to being cost effective or provide the most accurate tolerances.

One type of weld adapter is shown in U.S. Pat. No. 5,280,964, issued to Walker et al, the entire specification of which is incorporated herein by reference. While this shows the need of a useful weld adapter, it has proven to be challenging and expensive to manufacture.

Accordingly, there exists a need for an improved weld adapter which overcomes the aforementioned disadvantages.

SUMMARY OF THE INVENTION

The present invention is a weld adapter including a body portion having a first aperture and at least two flanges connected to the body portion. The present invention also includes a second aperture formed in one of the at least two flanges, with the second aperture substantially aligned with the first aperture. Additionally, one of the flanges is adapted to be connected to a structure.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 1 is a top view of a weld adapter prior to the attachment flanges and the securing flange being folded, according to the present invention;

FIG. 1A is a side view of a weld adapter prior to the attachment flanges and the securing flange being folded, according to the present invention;

FIG. 2 is a top view of a weld adapter, according to the present invention;

FIG. 3 is a sectional side view taken along lines 3-3 of FIG. 2;

FIG. 4 is a first top view of a weld adapter with a bolt extending through the first aperture and the second aperture, according to the present invention;

FIG. 5 is a sectional side view taken along lines 5-5 of FIG. 4;

FIG. 6A is a second top view of a weld adapter having a bolt extending through the first aperture and the second aperture, according to the present invention;

FIG. 6B is a sectional side view taken along lines 6B-6B of FIG. 6A;

FIG. 7A is a top view of an alternate embodiment of a weld adapter with a bolt extending through the first aperture and the second aperture, according to the present invention;

FIG. 7B is a sectional side view taken along lines 7B-7B of FIG. 7A;

FIG. 8A is a top view of another alternate embodiment of a weld adapter with a bolt extending through the first aperture and the second aperture, according to the present invention; and FIG. 8B is a sectional side view taken along lines 8B-8B of FIG. 8A.

DETAILED DESCRIPTION OF THE PREFERRED EMBODIMENTS

The following description of the preferred embodiment(s) is merely exemplary in nature and is in no way intended to limit the invention, its application, or uses.

Referring to the Figures generally, a weld adapter according to the present invention is shown generally at 10. The adapter 10 includes a body portion 12 and at least two flanges. In this embodiment, there are four flanges, three attachment flanges 14 and a securing flange 16. The three attachment flanges 14 and the securing flange 16 are all formed as part of the body portion 12 and are folded in the manner shown in FIG. 2, the function of which will be described later.

A first aperture 18 is formed in the body portion 12 and a second aperture 20 is formed in the securing flange 16. The first aperture 18 is generally circular in shape, is non-threaded, and is suitable for receiving a fastener, such as a bolt 22, having a head 24 and a threaded portion 26. However, it is within the scope of the invention that other types of fasteners could also be used with the weld adapter 10 of the present invention, these fasteners include, but are not limited to, a screw, lug, dowel, hook, nail, or the like. The second aperture 20 in this embodiment is substantially in the shape of a hexagon, the function of which will be described later.

As previously mentioned, the three attachment flanges 14 and the securing flange 16 are all folded as shown in FIGS. 2-8B. The three attachment flanges 14 are folded at a substantially ninety degree angle in relation to the body portion 12 along fold lines 28. This allows for the attachment flanges 14 to be welded onto a structure, such as a tank 30. The welding process of welding the attachment flanges 14 to the tank 30 will form a weld seam 32 at the location where each of the attachment flanges 14 is attached to the tank 30.

Prior to welding the attachment flanges 14 to the tank 30, the securing flange 16 is folded over substantially one-hundred-eighty degrees along the fold lines 34, as shown in FIG. 2, such that the center of the first aperture 18 is in alignment with the center of the second aperture 20. The securing flange 16 is folded to provide a gap, generally shown at 36, located between the securing flange 16 and the body portion 12. The width of the gap 36 is determined by the distance between the fold lines 34, indicated at 38.

Once the securing flange 16 is folded over as shown in FIG. 2, the threaded portion 26 of the bolt 22 is inserted through the first aperture 18 and the second aperture 20 such that the head portion 24 of the bolt 22 is located within the second aperture 20. Because of the gap 38, the head portion 24 is partially disposed within the second aperture 20, preferably where approximately half the head portion 24 may be seen on each side of the securing flange 16, as best seen in FIGS. 4 and 5.

The thickness of the securing flange 16 serves the purpose of preventing the bolt 22 from rotating once a torsional force is applied to the bolt 22. In use, the bolt 22 is placed into the first aperture 18 and the second aperture 20 such that the head portion 24 of the bolt 22 is disposed within the second aperture as described above, then each of the attachment flanges 14 are welded to the tank 30. Once the attachment flanges 14 are welded to the tank 30, the bolts 22 can be used to mount the tank 30 in a desired location, such as a wall, floor, storage compartment of a vehicle, or the like. A nut (not shown) can simply be rotated onto the threaded portion 26 of the bolt 22, allowing the bolt 22 to attach the tank 30 in any desired location.

The weld adapter 10 of the present invention is preferably made from a suitable material, such as metal. The material is preferably a material capable of being cold formed and welded to a surface. Accordingly, suitable materials for the manufacture of weld adapters include, but are not limited to, iron base alloys, such as steel and stainless steel. Alternatively, it is possible to manufacture weld adapters from other alloy systems including, but not limited to, aluminum alloys, copper alloys, and the like. The weld adapter 10 of the present invention is formed using a stamping process; the stamping process is carried out by a progressive die, or the like. The weld adapter 10 is initially a flat piece of metal, as shown in FIGS. 1 and 1A, and the first aperture 18 and the second aperture 20 are punched in first. Once the first aperture 18 and the second aperture 20 are punched, the attachment flanges 14 and the securing flange 16 can be folded into the positions shown in the Figures using a progressive die.

The weld adapter 10 of the present invention is not limited for use with one type of bolt 22. The size of the first aperture 18 and the second aperture 20 can be varied to accommodate bolts 22 of other sizes as well. The bolt 22 shown in FIGS. 4-6B is a one-half-inch bolt. However, it is within the scope of the invention that bolts 22 of other sizes, such as a three-eighths-inch (shown in FIGS. 7A and 7B) or five-eighths-inch (shown in FIGS. 8A and 8B) could be used as well. Essentially, the first aperture 18 and the second aperture 20 could be cut such that any size bolt 22 (either metric or English) could be used, as long as enough material is left for the securing flange 16 after the first aperture 18 and the second aperture 20 are punched out to provide the weld adapter 10 with the proper amount of strength to withstand the torsion and tensile stresses applied to the bolt 22.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A weld adapter connected to a structure, comprising:
a body portion having a first aperture;
at least two flanges connected to said body portion and at least one of said at least two flanges connected to said structure;
a second aperture formed in one of said at least two flanges, with the center of said second aperture substantially aligned with the center of said first aperture, one of said flanges being adapted for connection to said structure; and
wherein said structure is connected to one of said at least two flanges by using one process selected from the group consisting of welding, brazing, and gluing.

2. The weld adapter of claim 1, said at least two flanges comprising:
a securing flange formed as a portion of said body portion, said second aperture formed in said securing flange;
a first attachment flange formed as a portion of said body portion;
a second attachment flange formed as a portion of said body portion on the opposite side of said body portion as said first securing flange; and
a third attachment flange formed as a portion of said body portion in a location on the opposite side of said body portion as said securing flange.

3. The weld adapter of claim 2, wherein said first securing flange, said second securing flange, and said third securing flange are all at a position of substantially ninety degrees in relation to said body portion, and are parallel to one another.

4. The weld adapter of claim 2, wherein said securing flange is folded substantially one-hundred-eighty degrees in relation to said body portion such that the center of said first aperture is substantially aligned with the center of said second aperture.

5. The weld adapter of claim 4, further comprising a fastener received by said first aperture and said second aperture, wherein said fastener is used for securing said structure in a desired location.

6. The weld adapter of claim 5, wherein said fastener is one selected from the group consisting of a bolt, a screw, a lug, a dowel, a hook, and a nail.

7. The weld adapter of claim 4, further comprising a gap formed between said securing flange and said body portion when said securing flange is folded one-hundred-eighty degrees in relation to said body portion.

8. The weld adapter of claim 1, said second aperture further comprising a shape selected from the group consisting of a triangle, a square, a hexagon, a rectangle, a trapezoid, and a polygon.

9. The weld adapter of claim 1, being adapted for connection to said structure that is a tank.

10. A weld adapter, comprising:
a body portion;
a first aperture formed in said body portion;
a plurality of attachment flanges extending away from, and substantially perpendicular to said body portion;

a securing flange connected to said body portion and parallel to said body portion;

a second aperture formed as a portion of said securing flange, the center of said second aperture being aligned with the center of said first aperture;

a fastener extending through said first aperture and said second aperture; and a structure, in which said plurality of attachment flanges are connected to said structure.

11. The weld adapter of claim 10, further comprising said securing flange to be formed as a portion of said body portion and folded substantially one-hundred-eighty degrees in relation to said body portion to align the center of said first aperture with the center of said second aperture.

12. The weld adapter of claim 11, further comprising a gap between said securing flange and said body portion.

13. The weld adapter of claim 10, wherein said plurality of attachment flanges are substantially parallel to one another.

14. The weld adapter of claim 10, wherein a portion of said fastener is disposed within said second aperture such that upon application of rotational force to said fastener, said fastener does not substantially rotate relative to said securing flange or said body portion.

15. The weld adapter of claim 14, the shape of said second aperture being one selected from the group consisting of a triangle, a square, a rectangle, a polygon, a hexagon, a heptagon, and an octagon.

16. The weld adapter of claim 15, at least a portion of said fastener being substantially the same shape as said second aperture such that said portion of said disposed within said second aperture is prevented from rotating.

17. The weld adapter of claim 10, said fastener further comprising a bolt having a threaded portion extending through said first aperture, and a head portion partially received in said second aperture such that when a rotational force is applied to said bolt, said second aperture will prevent said bolt from rotating.

18. The weld adapter of claim 10, wherein said plurality of flanges are connected to said structure using one process selected from the group consisting of welding, brazing, and gluing.

* * * * *